United States Patent
Liu et al.

(10) Patent No.: US 6,744,727 B2
(45) Date of Patent: Jun. 1, 2004

(54) APPARATUS AND METHOD FOR SPARE CAPACITY ALLOCATION

(75) Inventors: Yu Liu, Raleigh, NC (US); David TIpper, Pittsburgh, PA (US)

(73) Assignee: The University of Pittsburgh, Pittsburgh, PA (US)

(*) Notice: Subject to any disclaimer, the term of this patent is extended or adjusted under 35 U.S.C. 154(b) by 0 days.

(21) Appl. No.: 09/928,287

(22) Filed: Aug. 10, 2001

(65) Prior Publication Data

US 2002/0097680 A1 Jul. 25, 2002

Related U.S. Application Data

(60) Provisional application No. 60/224,246, filed on Aug. 10, 2000.

(51) Int. Cl.[7] ............................................. H04L 12/26
(52) U.S. Cl. .................. 370/228; 370/217; 370/218; 370/221; 370/225; 370/226; 370/227
(58) Field of Search ................................ 370/216, 217, 370/218, 221, 222, 223, 225, 226, 227, 228, 389, 392, 395.1, 396, 395.31, 395.32, 395.51, 395.52, 395.53, 255, 256

(56) References Cited

U.S. PATENT DOCUMENTS

| | | | | |
|---|---|---|---|---|
| 5,850,505 | A | * 12/1998 | Grover et al. | 714/4 |
| 5,999,286 | A | * 12/1999 | Venkatesan | 359/117 |
| 6,377,543 | B1 | * 4/2002 | Grover et al. | 370/227 |
| 6,421,349 | B1 | * 7/2002 | Grover | 370/408 |

OTHER PUBLICATIONS

Murakami K et al.: "Optimal Capacity and Flow Assignment for Self–Healing ATM Networks Based on Line and End–to–End Restoration" IEEE/ACM Transactions On Networking, IEEE, Inc. New York, US, vol. 6, No. 2, Apr. 1, 1998, pp. 207–221, XP00075 1633; ISSN: 1063–6692.

Ko K W et al.: "A Local Map Based (LMB) Self–Healing Scheme for Arbitrary Topology Networks" IEEE Global Telecommunications Conference. Phoenix, AZ, Nov. 3–8, 1997, Global Telecommunications Converence (Globecom), New York, IEEE, US, vol. 3, Nov. 3, 1997 pp. 1393–1397, XP000737755; ISBN: 0–7803–4199–6.

Smith R N et al.: "ATM Peer Group Leader Attack and Mitigation" Milcom 1999. IEEE Military Communications Conference Proceedings. Atlantic City, NJ, Oct. 31,–Nov. 3, 1999, IEEE Military Communications Conference, New York, NY: IEEE, US vol. vol. 1 of 2 Conf. 18, Oct. 31, 1999, pp. 729–733, XP000922005, ISBN: 0–7803–5539–3.

R. K. Ahuja, T. L. Magnanti, and J. B. Orlin. Network Flows: Theory, Algorithms and Applications. Prentice Hall, New York, 1993, ISBN 0–13–617549–X.

A. Al–Rumaih, D. Tipper, Y. Liu, and B. A. Norman. Spare capacity planning for survivable mesh networks. In Proceedings IFIP–TC6 Networking 2000, pp. 957–968, Paris, France, May 2000, Lecture Notes in Computer Science (LNCS).

(List continued on next page.)

Primary Examiner—Wellington Chin
Assistant Examiner—William C. Schultz
(74) Attorney, Agent, or Firm—Thorp Reed & Armstrong LLP

(57) ABSTRACT

A method is given for deriving a backup path routing spare capacity template that is feasible, scalable, adaptive, much faster, and near global optimal in redundancy reduction. The method includes determining working paths, aggregating the working paths into a first matrix, determining backup paths, aggregating the backup paths into a second matrix, and deriving the template from the first and second matrices. A method is also given for successively approximating the optimal spare capacity allocation needed for a network. The method includes, determining the link cost associated with a selected traffic flow's backup path, determining an updated link cost that is less than the current link cost, determining a backup path with the updated link cost, and notifying the rest of the network of the backup path.

33 Claims, 5 Drawing Sheets

OTHER PUBLICATIONS

Ken Ambs, Sebastian Cwilich, Mei Deng, David J. Houck, David F. Lynch, and Dicky Yan. Optimizing restoration capacity in the AT&T network. Edelman Finalist Paper, INTERFACE, Jan.–Feb. 2000.

Jon Anderson, Bharat T. Doshi, Subrahmanyam Dravida, and P. Harshavardhana. Fast restoration of ATM networks. IEEE Journal on Selected Areas of Communications, 12(1):128–138, 1994.

D. O. Awduche, L. Berger, D. Gan, T. Li, and G. Swallow. RSVP–TE: Extensions to RSVP for LSP tunnels. Internet draft, Internet Engineering Task Force, Sep. 1999.

L.T.M. Berry, B.A. Murtagh, G. McMahon, S. Sugden, and L.Welling. An integrated GA–LP approach to communication network design. Telecommunication Systems, 12:265–280, 1999.

R. Braden, L. Zhang, S. Berson, S. Herzog, and S. Jamin. Resource ReSerVation Protocol (RSVP)—Version 1 Functional Specication. Internet Engineering Task Force, Sep. 1997.

B. Van Caenegem, W. Van Parys, F. De Turck, and P. M. Demeester. Dimensioning of survivable WDM networks. IEEE Journal on Selected Areas of Communications, 16(7):1146–1157, Sep. 1998.

R. Cotter, D. Mehdi, and D. Tipper. Traffic backlog and impact on network dimensioning for survivability for wide–area VP–based ATM networks. In Proceedings of 15th International Tele–traffic Congress, Washington, DC, Jun. 1997.

S. Cwilich, M. Deng, D. J. Houck, and D. F. Lynch. An LP–based approach to restoration network design. In ITC 16, Edinburgh, Scotland, Jun. 1999.

P. Demeester and M. Gryseels. Resilience in multilayer networks. IEEE Communications Magazine, 37(8):70–76, 8 1999.

Berna Dengiz, Fulya Altiparmark, and Alice E. Smith. Local search genetic algorithm for optimal design of reliable networks. IEEE Trans. on Evolutionary Computation, 1(3):179–188. Sep. 1997.

B.T. Doshi, S. Dravida, P. Harshavardhana, and Y. Wang. Optical network design and restoration. Bell Labs Technical Journal, pp. 58–84, Jan. 2000.

R. Doverspike. Trends in layered network management of ATM, SONET and WDM technologies for network survivability and fault management. Journal of Network and System Management, 5:215–220, 1997.

R. Doverspike and B. Wilson. Comparison of capacity efficiency of DCS network restoration routing techniques. Journal of Network and System Management, 2(2):95–123, 1994.

C. Dovrolis and P. Ramanathan. Resource aggregation for fault tolerance in integrated service networks. ACM Computer Communication Review, 29(2):39–53, 1998.

J. Duato. A theory of fault–tolerant routing in wormhole networks. IEEE Trans. on Parallel and Distributed Systems, 8(8):790–802, Aug. 1997.

D. Anthony Dunn, Wayne D. Grover, and Mike H. MacGregor. Comparison of k–shortest paths and maximum flow routing for network facility restoration. IEEE Journal on Selected Areas of Communications, 2(1):88–99, 1 1994.

Marshall L. Fisher. The Lagrangian relaxation method for solving integer programming problems. Management Science, 27(1):1–18, Jan. 1981.

Internet Engineering Task Force. Multiprotocol Label Switching. http://www.ietf.org/html/charters/mpls–charter.html.

Bernard Fortz and Mikkel Thorup. Internet traffic engineering by optimizing OSPF weights. In Proceedings of IEEE INFOCOM, Mar. 2000.

R. Rourer, D. M. Gay, and B. W. Kernighan. AMPL: a Modeling Language for Mathematical Programming. Scientific Press, San Francisco, 1993. ISBN 0–789–50701–3.

Mario Gerla and Leonard Kleinrock. On the topological design of distributed computer networks. IEEE Transactions on Communications, 25(1):48–60, Jan. 1977.

Alexander Gersht, Shaygan Kheradpir, and Alexander Shulman. Dynamic bandiwdth–allocation and path restoration in SONET self–healing networks. IEEE Trans. on Reliability, 45(2):321–331, Jun. 1996.

F. Glover and M. Laguna. Tabu search. Chapter in "Modern heuristic techniques for combinatorial problems," Edited by C. Reeves, Oxford: Blackwell Scientific Publishing, pp. 70–141. ISBN 0470220791.

F. Glover and M. Laguna. Tabu search. In P. M. Pardalos and M. G. C. Resende, editors, the handbook of Applied Optimization. Oxford Academic Press, http://bus.colorado.edu/Faculty/Laguna/Papers/ts2.pdf, 1999.

T1A1.2 Working Group. A technical report on network survivable performance. Technical Report 24, ANSI, Nov. 1993.

W. D. Grover and D. Y. Li. The forcer concept and express route planning in mesh–survivable networks. Journal of Network and System Management, 7(2):199–223, 1999.

W. D. Grover, R. R. Iraschko, and Y. Zheng. Comparative methods and issues in design of mesh–restorable STM and ATM networks. In P. Soriano B. Sanso, editor, Telecommunication Network Planning, pp. 169–200. Kluwer Academic Publishers, 1999.

W.D. Grover. Distributed restoration of the transport network. In Salah Aidarous and Thomas Plevyak, editors, Telecommunications Network Management into the 21st Century, Techniques, Standards, Technologies and Applications, IEEE Press Ch. 11, pp 337–417 1991.

M. Herzberg. A decomposition approach to assign spare channels in self–healing networks. In Proceedings of IEEE Global Communications Conference (Globecom), pp. 1601–1605, Nov. 1993.

M. Herzberg, S. Bye, and U. Utano. The hop–limit approach for spare–capacity assignment in survivable networks. IEEE/ACM Transactions on Networking, pp. 775–784, Dec. 1995.

M. Herzberg, D. Wells, and A. Herschtal. Optimal resource allocation for path restoration in mesh–type self–healing networks. In Proceedings of 15th International Teletraffic Congress, vol. 15, Washington, D.C., Jun. 1997.

Peter L. Higginson and Michael C. Shand. Development of router clusters to provide fast failover in IP networks. Digital Technical Journal, 9(3):32–41, 1997.

ILOG. Using the CPLEX Callable Library. ILOG, Inc., 1998.

R. Iraschko, M. MacGregor, and W. Grover. Optimal capacity placement for path restoration in STM or ATM mesh survivable networks. IEEE/ACM Transactions on Networking, pp. 325–336, Jun. 1998.

B. Jaeger and D. Tipper. On fault recovery priority in ATM networks. In Proceedings of 1998 IEEE International Communications Conference (ICC'98), Atlanta, GA, Jun. 1998.

Bjorn Jaeger. Fault recovery routing: High penalty cases and how to avoid them. In the 5th INFORMS Telecommunications Conference, BOCA 2000, 2000.

Ryutaro Kawamura. Architectures for ATM network survivability. IEEE Communications Surveys, 1(1):2–10, Fourth Quarter 1998. www.comsoc.org/pubs/surveys.

Ryutaro Kawamura, Kenichi Sato, and Ikuo Tokizawa. Self–healing ATM networks based on virtual path concept. IEEE Journal on Selected Areas of Communications, 12(1):120–127, Jan. 1994.

Ryutaro Kawamura and Hiroshi Ohta. Architectures for ATM networks survivability and their field deployment. IEEE Communications Magazine, pp. 88–94, Aug. 1999.

Ryutaro Kawamura and Ikuo Tokizawa. Self–healing virtual path architecture in ATM networks. IEEE Communications Magazine, 9, 1995.

A. Kershenbaum. Telecommunication Network Design Algorithms. McGraw–Hill, 1993.

L. Kleinrock and F. Kamoun. Hierarchical routing for large networks; performance evaluation and optimization. Computer Networks, 3:155–174, 1979.

Murali Kodialam and T.V. Lakshman. Dynamic routing of bandwith guranteed tunnels with restoration. In Proceedings of IEEE INFOCOM, Mar. 2000.

M. Laguna and F. Glover. Bandwidth packing: a tabu search approach. Management science, 39(4):492–500, 1993.

Yu Liu and David Tipper. Scaling spare capacity design techniques for survivable network. In the 5th INFORMS Telecommunications Conference, BOCA 2000, Boca Raton, FL. Mar. 2000.

Z. M. Ma, M. Deng, K. Ehrlich, and P. Dollard. LIBRA: A new distributed network restoration paradigm. In Proceedings of IEEE Global Communications Conference (Globecom), 2000. libra.globecom.doc.

M.H. MacGregor, W.D. Grover, and K. Ryhorchuk. Optimal spare capacity preconfiguration for faster restoration of mesh networks. Journal of Network and System Management. 5(2):159–171. 1997.

J.C. McDonald. Public network integrity—avoiding a crisis in trust. IEEE Journal on Selected Areas of Communications, 12(1):5–12, Jan. 1994.

D. Medhi. A unified approach to network survivability for teletraffic networks: Models, algorithms and analysis. IEEE Transactions on Communications, 42(2/3/4):534–547, 1994.

D. Medhi. Multi–hour, multi–traffic class network design for virtual path–based dynamically reconfigurable wide–area ATM networks. IEEE/ACM Transactions on Networking, 3(6):809–817, Dec. 1995.

Deep Medhi and David Tipper. Some approaches to solving a multi–hour broadband network capacity design problem. Telecommunication Systems, 13(2);269–291, 2000.

L Nederlof, Kris Struyue, Howard Misser Chris Shea, Yonggang Du, , and Braulio Tamayo. End–to–end survivable broadband networks. IEEE Communications Magazine, pp. 63–70, 9 1995.

Arun N. Netravali. When networking becomes a second nature: The next 25 years . . . and beyond. Bell Labs Technical Journal, pp. 203–214, Jan. 2000.

D. J. Pai and Henry L. Owen. An algorithm for bandwidth management with survivability constraints in ATM networks. In Proceedings of IEEE ICC'97, pp. 261–266, 1997.

Mario Pickavet and Piet Demeester. A zoom–in approach to design SDH mesh restorable networks. Journal of Heuristics, 6(1), Apr. 2000.

S. Ramamurthy and B. Mukherjee. Survivable WDM mesh networks, part 1—protection. In Proceedings of IEEE INFOCOM'99, New York, USA, Mar. 21–25 1999. IEEE, IEEE Press.

S. Ramamurthy and B. Mukherjee. Survivable wdm mesh networks, part ii—restoration. In Proceedings of IEEE International Conference on Communications, 1999.

Byung Han Ryu, Masayuki Murata, and Hideo Miyahara. Design method for highly reliable virtual path based ATM networks. IEICE Transactions on Communications, E79–B(10):1500–1514. 10 1996.

H. Sakauchi, Y. Nishimura, and S. Hasegawa. A self–healing network with an economical spare–channel assignment. In Proceeding of IEEE Global Communications Conference (Globecom), pp. 438–442, Nov. 1990.

Robert Sedgewick. Algorithms. Readings, Mass.: Addison–Wesley, 2 edition, 1988. ISBN: 0201066726, new Edition exists.

Ching–Chir Shyur, Ta–Chien Lu, and Ue–Pyng Wen. Applying tabu search tospare capacity planning for network restoration. Computers & Operations Research, 26(10):1175–1194, Oct. 1999.

A. Srikitja and D. Tipper. Virtual private network design for the next generation Internet. In the 5th INFORMS Telecommunications Conference, BOCA 2000, Boca Raton, FL, Mar. 2000.

A. Srikitja, D. Tipper, and D. Medhi. On providing survivable services in the next generation Internet. In Proceedings of IEEE Military Communications Conference, Atlantic, NJ, Oct. 1999.

M. Stoer. Design of Survivable Networks. Number 1531 in Lecture Notes in Mathematics. Springer–Verlag, New York, 1992. ISBN: 0–387–56271–0.

Kris Struyve, Bart Vande Velde, and Piet Demeester. A novel generic gateway protection configuration applied to ATM networks. In Proceedings of IEEE INFOCOM, pp. 1174–1179. 1997.

Paul Veitch and Dave Johnson. ATM network resilience. IEEE Network, pp. 26–33, Sep./Oct. 1997.

W.–P. Wang, D. Tipper, B. Jager, and D. Medhi. Fault recovery routing in wide area packet networks. In Proceedings of 15th International Tele–traffic Congress, Washington, DC, Jun. 1997.

T.–H. Wu. Emerging technologies for fiber network survivability. IEEE Communications Magazine, 33(2):58–74, Feb. 1995.

Tsong–Ho Wu. Fiber Network Service Survivability. Artech House, 1992.

Tsong–Ho Wu. A passive protected self–healing mesh network architecture and applications. IEEE/ACM Transactions on Networking, 2(1):40–52, Feb. 1994.

Xipeng Xiao and Lionel M. Ni. Internet Qos: A big picture. IEEE Network, pp. 8–18, Mar./Apr. 1999.

Yijun Xiong and Lorne G. Mason. Restoration strategies and spare capacity requirements in self–healing ATM networks. IEEE/ACM Transactions on Networking, 7(1):98–110, Feb. 1999.

\* cited by examiner

FIG. 1

Fault Management Table on Link $l(l=1)$ of Network in Fig. 1

| $M_l$ | Flow Set $F_l$ | | | | Spare Capacity Requirement $V_l$ |
|---|---|---|---|---|---|
| | 3: a-d | 4: a-e | 6: b-d | 7: b-e | |
| $f:2$ | 1 | 1 | 0 | 0 | $m_3 + m_4 = 2$ |
| 3 | 0 | 0 | 1 | 0 | $m_6 = 1$ |
| 4 | 0 | 0 | 0 | 1 | $m_7 = 1$ |
| 5 | 0 | 0 | 1 | 0 | $m_6 = 1$ |
| 6 | 0 | 0 | 0 | 0 | 0 |
| 7 | 1 | 0 | 0 | 0 | $m_3 = 1$ |
| | | | | | $s_l = \max(V_l) = 2$ |

FIG. 3

APPARATUS AND METHOD FOR SPARE CAPACITY ALLOCATION

RELATED APPLICATIONS

The present application claims the priority benefit of U.S. Provisional Patent Application entitled "SPARE CAPACITY ALLOCATION METHOD, ANALYSIS AND ALGORITHMS, Ser. No. 60/224,246 filed Aug. 10, 2000.

STATEMENT REGARDING FEDERALLY SPONSORED RESEARCH

This invention was made with government support under NSF Contract No. NCR-9506652 and DARPA Contract No. F30602-97-1-0257. The government may have certain rights in this invention.

FIELD OF THE INVENTION

The present invention relates generally to techniques for improving network survivability and more particularly to techniques for determining a spare capacity allocation and techniques for optimizing a network restoration scheme.

BACKGROUND

Telecommunication networks occupy a critical role in today's society. The failure of a network, such as a telephone network, a medical database network, a banking computer network, a military network, an air traffic control network or the Internet, among others, could have catastrophic consequences.

Most networks are comprised of multiple nodes (such as computers, routers, servers, and switching devices, among others) interconnected by multiple links (such as fiber optic cables and wireless relay stations, among others). Information (such as network status information, user data, and component address information, among others) originates at a source node, flows over a set of sequentially connected links, and terminates at a destination node. A node may act as both a source node and a destination node. For example, a computer (source node) requests information from a router (destination node) over a fiber optic cable (link). The router (now acting as the source node) sends the requested information back over the fiber optic cable (link) to the computer (now acting as the destination node). A source node and its corresponding destination node are referred to as a "node pair". It should be noted that the terms "data," "traffic," and "traffic demand" are intended to be synonymous with the term "information" hereinafter.

The route traveled by the information from the source node to the destination node is called a "path." A path may include the source and destination nodes and one or more links. Furthermore, the path may contain intermediate nodes which pass the information to the next link or node. The path that is normally used for communication by a node pair is called the working path. Most networks establish the shortest path between the source node and the destination node as the working path. Thus, a route requiring one link to connect a node pair is preferred as the working path over a route requiring two links to connect the node pair.

A failure in any network component along a path, however, may prevent communication between the node pair. For example, a link that has failed within the working path will not allow information from the source node to reach the destination node. One or more component failures can easily cripple a network, thereby causing widespread communication failures. Network designers, to create a "survivable network", establish backup paths which act as detours when a component in the working path fails. The ability of a network to continue operating after a failure is known as a network's "survivability" or "survivability level".

Network designers must concentrate on providing cost-efficient spare capacity reservation at an acceptable survivability level. The "survivability level" gauges the percentage of network traffic that can be restored upon a failure. The ratio of the total spare capacity over the total working capacity, called the "network redundancy," is used to measure the cost efficiency of spare capacity allocation. Network redundancy is highly dependent on the network topology, as well as the algorithms used to determine the amount and placement of the spare capacity. It should be noted that "determine", as referred to in this disclosure, is intended to include calculating, inferring, and assuming, among others. The goal of survivable network design is to provide the maximum network survivability at the minimum network redundancy.

Many techniques have been developed and implemented to maximize network survivability. Traditional network survivability techniques have two components: survivable network design and network restoration. These components are complementary to each other and cooperate to achieve seamless service operation (i.e., the prevention of service disruptions) when a network component fails.

The first component of traditional network survivability techniques is survivable network design. Survivable network design refers to the incorporation of survivability strategies into the network design phase to mitigate the impact of a set of specific failure scenarios. A major component related to the creation of a survivable network is called spare capacity allocation ("SCA"). SCA refers to providing adequate resources within the network which enable traffic to be rerouted when a specific component fails (a link failure for example).

Designers face two major challenges related to SCA. The first challenge is determining how much spare capacity should be provisioned for the network. The second challenge is determining where that spare capacity should be located within the network. Several algorithms have been developed to assist designers in meeting these challenges. These algorithms are either classified as centralized or distributed algorithms. Centralized algorithms are implemented by a central controller, or processor, which has global information regarding the network. Centralized networks, although easy to implement, fail to adequately deal with the dynamic bandwidth provisioning and traffic fluctuations present in current networks such as ATM backbone networks and the Internet. Distributed algorithms, on the other hand, are implemented within each node in which network traffic travels. Distributed algorithms adequately address dynamic bandwidth provisioning and traffic fluctuations, but generally require more resources to implement and are not easily scaled to a changing network. Current algorithms require a large amount of computational time to achieve the desired result. Furthermore, the results obtained may not accurately approximate the optimal spare capacity requirement.

Therefore, there exists a need for a backup path routing scheme that is feasible, scalable, adaptive, much faster, and near global optimal in redundancy reduction.

The second component of traditional network survivability techniques is network restoration. Network restoration refers to rerouting traffic flow that has been affected by a network device failure. The affected traffic is detoured using either pre-planned spare capacity routing or dynamic fault-tolerant routing. In pre-planned spare capacity routing, the affected traffic is detoured to backup paths that have adequate spare capacity provisioned in the SCA design phase. Pre-planned spare capacity routing guarantees that service restoration occurs and minimizes the duration of the failure impact. Pre-planned spare capacity routing, however, requires allocating additional spare capacity, some of which may never be used. As such, the cost of implementing pre-planned spare capacity routing is relatively high.

Dynamic fault-tolerant routing, on the other hand, does not have spare capacity pre-allocated in anticipation of a specific failure. Instead, dynamic fault-tolerant routing establishes a backup path after a failure occurs using any available spare capacity. Although service restoration is not guaranteed and the duration and range of the failure impact is not minimized, dynamic fault-tolerant routing reduces the amount of spare capacity needed, thereby, reducing the implementation cost for the network.

With both pre-planned and dynamic routing, affected traffic is detoured using path restoration, link restoration, and fragment restoration. Path restoration refers to rerouting traffic within the end nodes (i.e., the source and destination nodes). Path restoration spreads the failure influence to a larger area within the network, but has a slow failure response speed. Link restoration refers to rerouting the traffic in the nodes adjacent to the failure (i.e., not necessarily within the source and destination nodes). Link restoration has a faster failure response speed, but has a significant impact on the area within the network that is close to the failure. Link restoration only patches the "hole" introduced by the failure. Finally, fragment restoration reroutes traffic within the nodes between the traffic end node (i.e., the source or destination node) and the node adjacent to the failure. Fragment restoration falls somewhere between link and path restoration for both the restoration speed and the area impacted by a failure.

The selection of backup paths in a network restoration scheme is classified either as failure dependent or failure independent. Failure dependent restoration depends on the failure state (i.e., which node or link has failed), meaning that different network failures are protected by different backup paths. It requires the network nodes to save additional network state information to achieve better utilization. Failure independent restoration, on the other hand, does not depend on the failure state, and therefore is easier to implement than failure dependent restoration. However, failure independent restoration usually requires additional spare capacity to implement.

A need exists, therefore, for a network restoration scheme that is adaptable to the current operational state of the network and is capable of providing a guaranteed level of service restoration without requiring additional spare capacity to implement.

The discussion of the present invention focuses on mesh-type networks. It should be noted, however, that the present invention is applicable to other network types and that the use of mesh-type networks is in no way intended to limit the scope of the present invention. A mesh-type network refers to an at least two-connected plain (or flat) network. Mesh-type networks exist mainly in backbone and interconnection networks and possess great advantages with respect to flexibility, providing survivable intelligence, and the ability to improve utilization.

Traditional network designers, given traffic demand locations and network QoS requirements, are responsible for several tasks related to mesh-type networks. One task, called "topology design", requires a designer to distribute and interconnect the network nodes and links. Topology design establishes the node locations and the link connectivity within the network's topology. Nodes and links must be located such that, should a portion of the network fail, the remaining portion of the network remains operational. This network characteristic is defined as two-link, or two-node connectivity. A two-link(node) connected topology has at least two link(node)-disjoint paths between any two origin-destination node pairs. Link-disjoint is discussed later in reference to FIG. 1.

Another important task, called "network synthesis", requires the network designer to provide sufficient resources (such as bandwidth, buffers, etc.) to transport all of the traffic demand with the guaranteed QoS requirements from the source node to the destination node while minimizing the total network cost. Network synthesis determines the traffic routing and resource dimensioning for the given network topology. Two problems related to network synthesis are resource design (or, capacity design when capacity is the main parameter of interest) and flow assignment. Multi-commodity flow (MCF) models (as are known in the art) are used for these problems. Additional constraints (such as traffic QoS guarantees, node buffer thresholds and link capacity limits, among others) can be applied to the model as well. In many cases, the MCF model is NP-hard (i.e., it is topology-dependent and does not scale with the number of link, number of nodes, and number of node pairs supporting traffic flow). Therefore, the scalability and application of the MCF model requires a good approximation method to find a near optimal solution for the network within a short period of time.

Additionally, designers use approximation methods to solve traditional network design problems and models. Traditional approximation methods include flow deviation, greedy construction, and Lagrangian methods. Modern heuristic methods include Simulated Annealing ("SA"), Genetic Algorithm ("GA") and Tabu Search ("TS") methods. All of these methods are used for network synthesis problems mentioned above. Designers also use mixed integer programming (MIP) models to formulate the networks link/node disjoint requirements, especially the link/node disjoint requirements between a working route and its backup routes. Link/node disjoint characteristics are additional constraints introduced by survivability requirements in the traditional network design problem. All of these approximation methods, however, suffer from one or more drawbacks, such as large computational time requirements and insufficient spare capacity allocation optimization results among others.

Therefore, a need exists for an approximation method that can quickly and accurately approximate the optimal spare capacity requirement for a network.

SUMMARY

The present invention offers a method for deriving a backup path routing resource provisioning template for a network. The method is feasible, scalable, adaptive, much faster, and near global optimal in redundancy reduction. The method includes determining a working path for each traffic flow in the network, aggregating the working paths into a first matrix, determining a backup path for each traffic flow, aggregating the backup paths into a second matrix, and deriving the resource provisioning template from the first and second matrices.

Additionally, the present invention offers a method for determining a minimum spare capacity required for one of a plurality of links in a network. The method includes creating a spare provision matrix and determining the minimum spare capacity required for one of the plurality of links in the network using the spare provision matrix.

The present invention also offers a method for determining a total spare capacity allocation for a mesh-type network. The method includes creating a spare provision matrix related to the network, and deriving the spare capacity allocation for the network from the spare provision matrix.

The present invention offers a means for successively approximating the optimal spare capacity allocation needed by a mesh-type network. The method includes selecting a traffic flow and determining the link cost associated with the traffic flow, where the link cost is associated with an incremental spare capacity. The method further comprise determining a backup path using the link cost, and notifying the rest of the network of the backup path. The method is then repeated for a next traffic flow.

The present invention further offers a method for dynamically creating a fault management table, indexed by link 1, that is used by a network having a total number of links equal to L. The method includes storing a failure impact matrix $M_l$ within the fault management table, storing a vector $V_l$ within the fault management table, and storing a spare capacity $s_l$ within the fault management table.

Additionally, the present invention offers an apparatus for operation within a network having a plurality of nodes interconnected by a plurality of links to facilitate a plurality of traffic flows within the network. The apparatus includes an input link carrying information related to the nodes, links, and traffic flows, a processor operable to receive said information from the input link and operable to derive a spare provision matrix from the information, and an output link operable to receive information from the processor and carry the information related to the spare provision matrix to at least one other node.

Finally, the present invention offers an apparatus for operation within a network having a plurality of nodes interconnected by a plurality of links to facilitate a plurality of traffic flows within the network. The apparatus includes an input port for carrying information related to the nodes, links, and traffic flows, a processor to receive the information from the input link, to derive a fault management table from the information and to dynamically implement a successive survivability restoration scheme, and an output port to receive information from the processor and output the information related to the fault management table and the successive survivability scheme to at least one other node.

BRIEF DESCRIPTION OF THE DRAWINGS

FIG. 1 illustrates the construction of a spare provision matrix according to an embodiment of the present invention.

FIG. 3 illustrates a Fault Management Table ("FMT") containing information obtained using a Successive Survivability Routing scheme ("SSR") according to an embodiment of the present invention.

DETAILED DESCRIPTION

Figure 2:
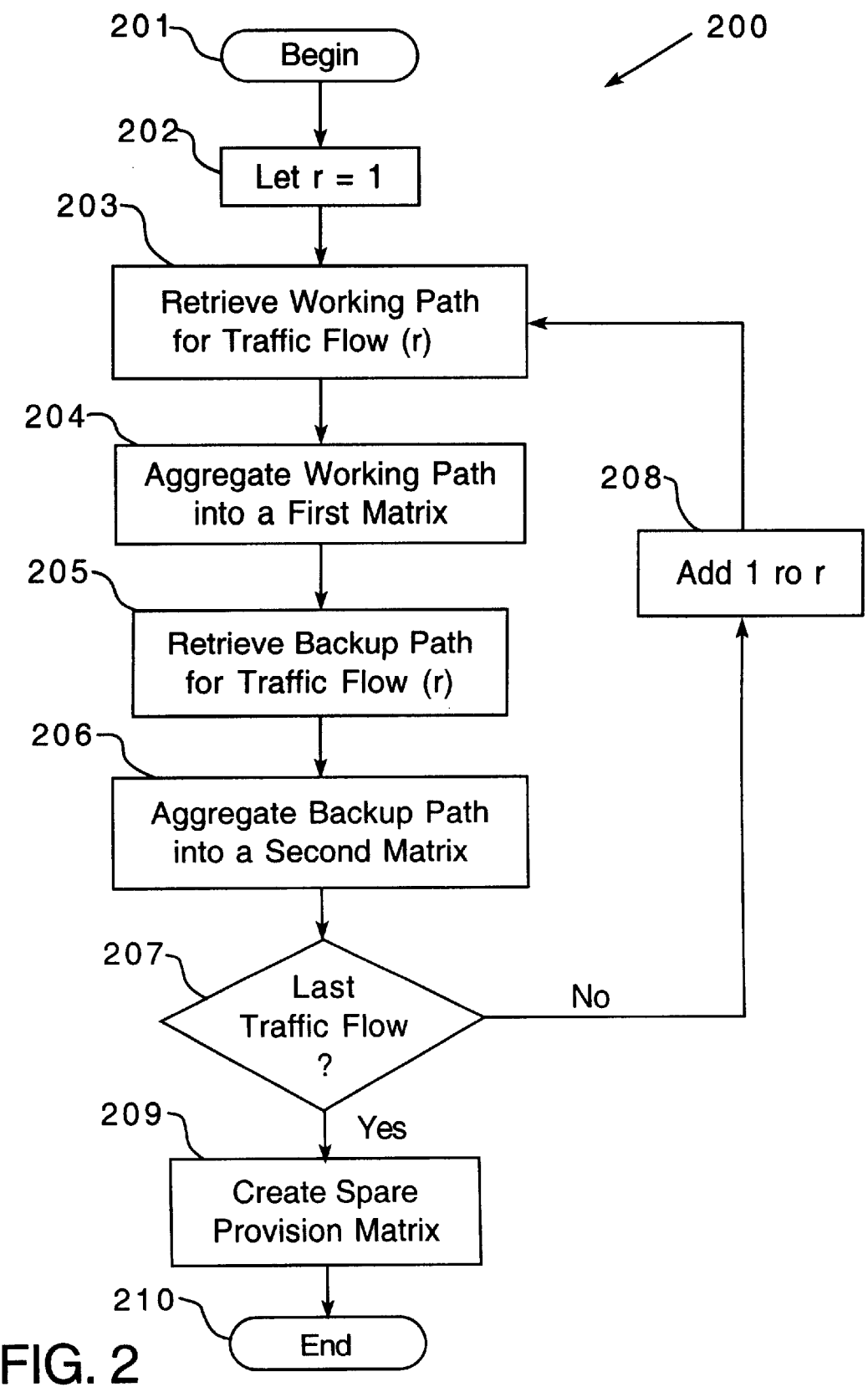
FIG. 2 illustrates an operational process for creating the spare provision matrix of FIG. 1 according to an embodiment of the present invention.

The present invention claims priority benefit of U.S. Provisional Patent Application entitled "SPARE CAPACITY ALLOCATION METHOD, ANALYSIS AND ALGORITHMS", Ser. No. 60/224,246 filed Aug. 10, 2000. The disclosure of the technical papers comprising the provisional application are attached as an appendix and are incorporated herein by reference in their entirety.

Figure 1:
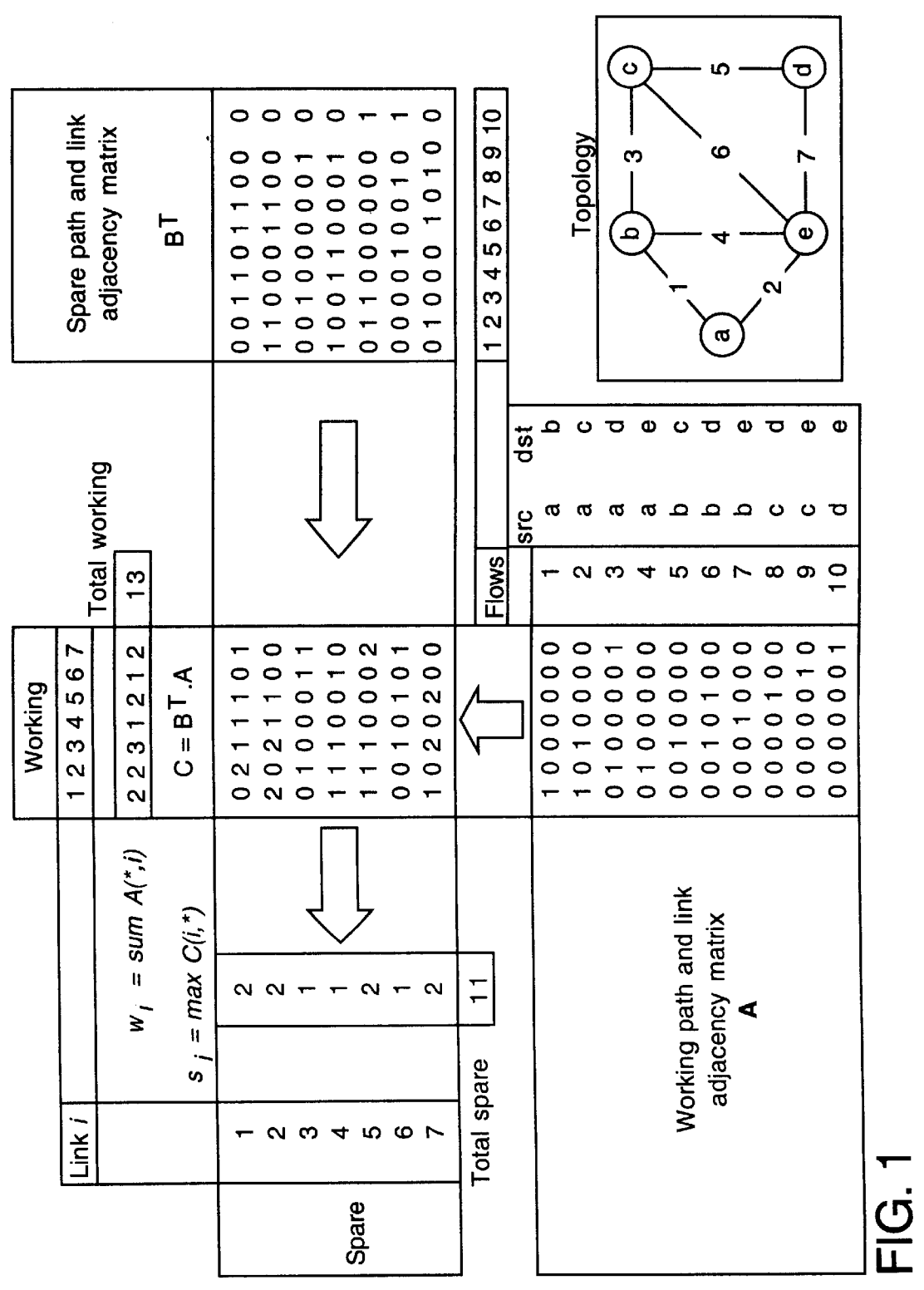

Throughout this disclosure, the term "spare provision matrix" or "provision matrix" will be substituted for the term "spare sharing matrix" which was used in the provisional application. FIG. 1 illustrates a spare provision matrix (C) according to an embodiment of the present invention. The spare provision matrix of FIG. 1 corresponds to the network 100 consisting of five nodes (labeled a through e) interconnected by seven links (numbered 1 through 7) with the given topology. FIG. 1 further illustrates a working-path-link-incidence matrix (A) for the network 100, the transpose of a backup-path-link-incidence matrix ($B^T$) for the network 100, a vector (m) 115 representing the capacity requirements for all traffic flows within the network 100, a vector w 105 representing the working capacity allocation of the network 100, and a vector (s) 110 representing the spare capacity allocation required for all the links within the network 100.

In the present embodiment, the network 100 is considered as a non-directed network with traffic flows between all the node pairs 101 (i.e., node pairs a-b, a-c, ... d-e). A node pair has a source node ("src") and a destination node ("dst"). It should be noted that a node within the node pair can act as both a source node and as a destination node, however for the present embodiment, the node pair need only be modeled once. The assignment of which node within the node pair is the source or destination for the present embodiment is irrelevant. For example, node "a" is placed in the "src" column and node "b" is placed in the "dst" column for node pair a-b. However, if node "a" was placed in the "dst" column and node "b" was placed in the "src" column, the results would be the same.

Each node pair is given a flow number corresponding to a traffic flow between the nodes in the node pair. For example in the present embodiment, the flow number "1" is assigned to the node pair a-b, whereas the flow number "8" is assigned to the node pair c-d.

The term "link-disjoint," as mentioned above, refers to two traffic flows that do not share a common link in their working paths. Referring to the network in FIG. 1 for example, the traffic flows having a working path a-b-c (using links 1 and 3) is said to be link-disjoint from the traffic flow having a working path e-d (using link 7).

It should be clear to one skilled in the art that the number of nodes and links, their relative topology, and the non-directed traffic flow of the network are chosen only as an exemplary illustration of the present embodiment, and in no way is intended to limit the scope of the present invention. It should also be apparent to one skilled in the art that the present invention can be implemented for any network, regardless of the network's size or topology, among others. Finally, it should be apparent to one skilled in the art that the general layout of the spare provision matrix, or the components used to create the spare provision matrix, may be altered while remaining within the scope of the present invention.

A vector $a_r=[a_{r,1}, a_{r,2}, \ldots, a_{r,L}]$ represents a working path for each node pair 101 having a traffic flow r. For vector $a_r$, r represents the flow number where $1 \leq r \leq D$, where D is the current number of flows in the network 100. The elements $a_{r,l}$ are binary indicator functions that are equal to "1", if and only if, the working path of the corresponding node pair uses link l, where L represents the total number of links in the network 100. Referring to FIG. 1 for example, links 3 and 5 are part of the working path for node pair b-d, the sixth flow in the given network. Thus $a_6$=[0, 0, 1, 0, 1, 0, 0], where only the elements corresponding to links 3 and 5 have a value of 1. The working path is then aggregated with the working paths of the other node pairs into a working-path-link-incidence matrix A=$[a_1^T, a_2^T, \ldots, a_D^T]^T$. In a similar manner, a backup path for each node pair is determined and aggregated into backup-path-link-incidence matrix B. As previously noted, "determine", as referred to in this disclosure, is intended to include calculating, inferring, and assuming, among others.

The working-path-link-incidence matrix, A, for the given network 100 topology is shown in FIG. 1. The matrix A contains ten rows, each row corresponding to the individual traffic flows between node pairs 101. The matrix A also contains seven columns corresponding to links 1 through 7. In addition to aggregating the vectors $a_r$, the matrix A can be directly created. The value "1" is entered into matrix A, if and only if, the traffic flow for the particular node pair traverses the particular link. The value "0" is entered into matrix A if the traffic flow for the particular node pair 101 does not traverse the particular link. For example, traffic flow between node pair a-b is accomplished over link 1. As such, the value "1" is entered into the matrix A location referring to node pair a-b and link 1 (i.e., row 1, col. 1). The value "0" is entered into the matrix A locations representing node pair a-b and links 2–7 (i.e., row 1, cols. 2–7). Likewise, traffic flow between node pair a-c traverses link 1 and link 3. Therefore, the value "1" is entered into the matrix A locations referring to node pair a-c and link 1 (row 2, col. 1) and node pair a-c and link 3 (row 2, col. 3). The value "0" is entered into the matrix A locations representing node pair a-c and the other, non-traversed links. The process is repeated for each node pair 101 to complete the working-path-link-incidence matrix A.

It should be noted that the present invention can be used in conjunction with any method or algorithm for determining the working path for each node pair. For example, a shortest path algorithm can be used to determine the working paths for each node pair, the working paths then being used to determine the working-path-link-incidence matrix A.

The backup-path-link-incidence matrix, B, is constructed in a manner similar to the manner in which matrix A is constructed. As mentioned above, matrix B can be constructed by aggregating a series of vectors, $b_1, b_2, \ldots, b_D$, that represent backup paths for all the node pairs 101 having a backup traffic flow., as B=$[b_1^T, b_2^T, \ldots, b_D^T]^T$. Matrix B can also be directly constructed. The following discussion will be limited to directly constructing the transposed matrix $B^T$ of said backup path link-incidence matrix B.

Matrix $B^T$, for the present embodiment, has seven rows corresponding to links 1 through 7 and ten columns corresponding to the individual traffic flows over the node pairs 101. The value "1" is entered into matrix $B^T$, if and only if, the backup traffic flow for the particular node pair 101 traverses the particular link. The value "0" is entered into matrix $B^T$ if the backup traffic flow for the particular node pair 101 does not traverse the particular link. For example, a backup path is chosen for node pair a-b that uses link 2 and link 4. As such, the value "1" is entered into the backup-path-link-incidence matrix $B^T$ locations referring to node pair a-b and link 2 (row 2 col. 1) and node pair a-b and link 4 (row 4, col. 1). The value "0" is entered into the matrix $B^T$ locations representing node pair a-b and the other, non-traversed links. Likewise, a backup path for node pair a-c is chosen that uses links 2, 5, and 7. The value "1" is entered into the backup-path-link-incidence matrix locations referring to node pair a-c and link 2 (row 2 col. 2), link 5 (row 5, col. 2) and link 7 (row 7, col. 2). The value "0" is entered into the matrix $B^T$ locations representing node pair a-c and the other, non-traversed links. The process is continued for each node pair 101 until the transposed backup-path-link-incidence matrix $B^T$ is completed.

It should be noted that the present invention can be used in conjunction with any method or algorithm for determining the backup path for each node pair 101. For example, a shortest path algorithm can be used to determine the backup path for each node pair 101, the backup paths then being used to determine the backup-path-link-incidence matrix B.

After the working-path-link-incidence matrix A and the backup-path-link-incidence matrix B are constructed, the spare provision matrix C is determined. In the present embodiment, the spare provision matrix is the found using the equation C=$B^T \cdot$Diag(m)$\cdot$A, where C represents the spare provision matrix, $B^T$ represents the transposed backup-path-link-incidence matrix, Diag(m) converts the vector m 115 to a diagonal square matrix with elements of m in the main diagonal, and A represents the working-path-link-incidence matrix. It should be apparent to those skilled in the art that the vector m can be used to represent network resources other than capacity. For example, the vector m may represent a network's delay, wavelength, and buffer size among others. Changing the quantity that vector m represents also changes the quantity/resource represented by matrix C. Thus, matrix C can be viewed as a resource provisioning template.

Each element, $C_{ij}$, in matrix C represents the minimum spare capacity required on link i when link j fails. For the spare capacity matrix C representing the network topology given in FIG. 1, for example, a failure of link #2 requires the following minimum spare capacity for the other links: link 1=2 (i.e., $C_{1,2}$=2), link 3=1 (i.e., $C_{3,2}$=1), link 4=1 (i.e., $C_{4,2}$=1), link 5=1 (i.e., $C_{5,2}$=1), link 6=0 (i.e., $C_{6,2}$=0), and link 7=0 (i.e., $C_{7,2}$=0). The network designer, therefore, can determine the minimum amount of spare capacity required for a link i should link j fail.

The total working capacity requirement for the network 100 is obtained from the working-path-link-incidence matrix A. The working capacity for said links are represented by a vector w=$[w_1, w_2, \ldots, w_L]$. The working capacity of a given link i is represented by $w_i$, where $w_i$=sum $(A_{r,i} \times m_r)$ for $A_{r,i}$ for $1 \leq r \leq D$. In other words, $w_i$ equals the sum of the entries of column i in matrix A if the traffic demands of all node pairs are at the same value of one. The vector w for the given network 100 is w=[2, 2, 3, 1, 2, 1, 2]. The total working capacity requirement for the network 100 is easily derived by summing the elements in vector w. Therefore, the total working capacity requirement for network 100 is thirteen.

The total, minimum spare capacity requirement for all links in the network 100 is found using vector s=$[s_1, s_2, \ldots s_L]$, 104 where $s_i$=max $C_{ij}$ for $1 \leq j \leq L$. In other words, $s_i$ equals the maximum value within the row i of spare provision matrix C. The vector s for the given network 100 is s=[2, 2, 1, 1, 2, 1, 2]. The total spare capacity requirement for the given network 100 is easily derived by summing the elements of vector s. Therefore, the total spare capacity requirement for the network 100 is eleven.

Several other issues facing the network designer solving the spare capacity allocation problem are represented by the spare provision matrix C. The non-uniform flow demands are easily combined in vector m 115 as shown above. Moreover, for asymmetric traffic demands, directed links must be used in the spare provision matrix C; this doubles L (i.e., the total number of links in the network) and requires each failure scenario to include two links in both directions. Furthermore, the per-flow based state information can be aggregated into spare provision matrix C. If there is traffic flow r with certain working path $a_r$ and backup path $b_r$, their contribution to the matrix C is a L×L matrix $C_r=a_r\cdot b_r^T$ where "·" is a vector product operation which takes a row vector on its left hand side and a column vector on its right hand side to produce a matrix. The spare provision matrix C is easily derived from the summation of the contributions $C_r$ of all flows and it is the only information required for spare capacity sharing in SCA problem. Per-flow based information in A and $B^T$ are no longer necessary for the spare capacity sharing operation. This not only demonstrates the scalability of the spare provision matrix method, but also provides enhanced privacy among different traffic flows in an opened network environment.

In the present embodiment, the spare provision matrix C is determined using a computing system having a processor, a memory, an input/output device, and a data storage device among others. The computing system can be any personal computer, mainframe, calculator, switch, router, and relay among others. The processor is any device capable of executing an instruction or series of instructions (for example instructions encoded into a computer program, etc.) to obtain a result. The memory is any device that is capable of storing information such as random-access-memory (RAM), read-only-memory (ROM), dynamic-random-access-memory (DRAM), and flash memory among others. The input/output device is a keyboard, sensor, scanner, touch pad, printer, display, terminal, and wire carrier among others. The data storage device is any optical disc drive, magnetic disc drive and magnetic tape drive among others.

In the present embodiment, information representing the node pairs, traffic flows, links, and network topology among others is entered into a computer system using an input device. The information is stored in the memory and data storage device. The processor accesses the information, determines the spare provision matrix (among others), stores the result in the data storage device, and delivers the result to an output device. It should be clear to one skilled in the art, that the spare provision matrix C can be determined manually, through the use of other automated systems, or a through a combination thereof. The description of the present embodiment is in no way intended to limit the scope of the present invention to a specific apparatus of determining the spare provision matrix C.

FIG. 2 illustrates operational process 200 for creating a spare provision matrix according to an embodiment of the present invention. Operational process 200 is initiated by operational process 201. In an embodiment of the present invention, operation 201 is triggered by a user during the network design phase. It should be clear to one skilled in the art that the operational process 200 can be triggered automatically (such as by a computer program among others) and can be triggered at a time other than the network design phase while still remaining within the scope of the present invention.

Operational control is then assumed by operation 202. Operation 202 sets r equal to 1, where r represents a traffic flow number. In the current embodiment, $1\leq r\leq D$ where D is the current number of traffic flows in the network. Operational control is then passed to operation 203.

Operation 203 retrieves the working path for the traffic flow r. The working path contains a source node, a destination node, and an interconnecting working path link. In the current embodiment of the present invention, the working path is previously determined on each individual traffic flow r using methods common in the art, such as a shortest path algorithm among others. Using a shortest path algorithm, the working path is determined to be one of the shortest paths that have link-disjoint alternative paths. It should be noted that other schemes can be used to determine the working path for the traffic flow r. As an alternative to retrieving a previously determined working path for traffic flow r, operation 203 determines the working path for the traffic flow r.

Operational control is assumed by operation 204 after the working path is retrieved for traffic flow r in operation 203. Operation 204 aggregates the working path of traffic flow r into a first matrix. In the current embodiment, the working path of traffic flow r is aggregated into a working-path-link-incidence matrix. The elements of the working-path-link-incidence matrix represent whether a link is used to carry traffic flow between a specific node pair during normal operation. An element of the working-path-link-incidence matrix is assigned the value "1" if a link is used to carry the traffic flow of the corresponding node pair during normal operation. If the link is not used to carry the traffic flow of the corresponding node pair during normal operation, a value "0" is assigned to the matrix element.

Operational control is then assumed by operation 205. Operation 205 retrieves the backup path for traffic flow r. The backup path for traffic flow r contains the same source and destination nodes as the working path. The backup path, however, contains a backup path link instead of the working path link. In the current embodiment of the present invention, the backup path is determined prior to implementing operational process 200 using methods common in the art. For example, a shortest path algorithm, in conjunction with the network state and the working path, is used. As such, a backup path will not contain a link that has previously failed or a link that is used by the working path for the particular traffic flow r. The backup path is then stored in a database within the system for retrieval by operation 205. As an alternative to retrieving a previously determined backup path for traffic flow r, operation 205 determines the backup path for the traffic flow r. Operational control is then passed to operation 206.

Operation 206 aggregates the backup path r found in operation 205 into a second matrix. In the current embodiment, the backup path r is aggregated into a backup-path-link matrix. The elements of the backup-path-link-incidence matrix represent whether a link is used to carry traffic flow between a specific node pair during backup operation. An element of the working-path-link-incidence matrix is assigned the value "1" if a link is used to carry the traffic flow of the corresponding node pair during backup operation. If the link in not used to carry the traffic flow of the corresponding node pair during backup operation, a value "0" is assigned to the matrix element.

Operational control is then assumed by determination operation 207. Determination operation 207 ascertains whether there are any more traffic flows for which a working path and a backup path need to be retrieved. If the current traffic flow is not the last to have working path and backup path information gathered, operational control branches NO and operation 208 assumes control. Operation 208 adds 1 to the value of r. Operational control is then passed to operation 202, and operations 202 through 207 are repeated. In the current embodiment, a working path and backup path is retrieved for each traffic flow within the network. In an alternative embodiment, a working path and a backup path is determined for less than each traffic flow used by the network. If the current traffic flow is the last to have working path and backup path information gathered, operational control branches YES and operation 209 assumes control.

Operation 209 creates a spare provision matrix using the first matrix created in operation 204 and the second matrix created in operation 206. In the current embodiment, the working-path-link-incidence matrix and the backup-path-link-incidence matrix are used to produce a spare provision matrix. The spare provision matrix is used to determine the total backup path capacity requirement, among others. The spare provision matrix replaces the per-flow based information (represented by the working-path-link incidence matrix and the backup-path-link-incidence matrix) is used to perform the spare capacity sharing operation in the network.

Operational control is then assumed by operation 210. Operation 210 terminates operational process 200.

FIG. 3 is an illustration of a Fault Management Table ("FMT") containing information obtained using a Successive Survivability Routing scheme ("SSR") according to an embodiment of the present invention. Each link has an associated FMT stored on the network. For example, the FMT associated with a link is located within the source node of the link or within a central database (among others). The FMT is used to store and calculate the spare provision matrix C, and further, to find the spare capacity allocation on each link as protection against any single link failure. Information stored within a FMT of link 1 includes the working paths used by node pairs whose backup path uses this link 1, and the minimum spare capacity values required on link 1 for protecting the failure of any other links. In the present embodiment, the FMT resides on each link, is updated to reflect changing network conditions, and is used during network restoration implementation.

As previously mentioned, network restoration can be accomplished using path restoration techniques. Path restoration refers to rerouting traffic within the source and destination nodes. A problem facing network designers utilizing path restoration is determining the amount of spare capacity and placement of the link-disjoint backup paths necessary to implement the path restoration plan. Network designers use the information within the FMTs as a way to determine a path-link integer programming model for the spare capacity allocation problem of the network.

The path restoration with link-disjoint backup path problem can be formulated as a path-link model. The path-link model is used to derive several formulas that represent the spare capacity allocation problem faced by network designers. The path-link model has design variables that represent the links and the backup paths of the traffic demands on the network's node pairs. A directed graph (N, L), where N and L are the node set and the link set, respectively, is used for a network. The total number of nodes is represented by N=|N|. Likewise, the total number of links is represented by L=|L|. The value $c_l$ represents the unit cost of link 1, for $l \in L$. Furthermore, the value D denotes a set of traffic demand pairs where $D \subset (N \times N)$, and where $D=|D| \leq N \times (N-1)$ if only bi-directional, point-to-point traffic demand pairs are considered. A traffic demand pair is a node pair consisting of a source and destination node having a traffic demand (i.e., traffic flow) there between.

In the path-link model, the demand node pair r (where $r \in D$) requires $m_r$ units of traffic demands with a restoration level of $\gamma^r$. For an embodiment of the present invention, the following values are assigned: $c_l=1$, $m_r=1$, and $\gamma^r=100\%$.

Each demand node pair $r \in X$, has a value $P^r$, which denotes a candidate set of loop-free backup paths that are link-disjoint from the given working path. $P^r$ is precalculated using methods common in the art. For example in a network without working links, a Floyd-Warshall algorithm (an all-pairs shortest path algorithm) can be used to find all feasible backup paths for all node pairs. The $p^{th}$ path in the path set $P^r$ is represented by a binary path-link indicator $\delta_l^{r,p}$, where $\delta_l^{r,p}=1$, if and only if, path p includes link 1. In the current embodiment, only single link failures are assumed; as such, $D_f$ represents the set of affected traffic demand pairs upon the failure of link f. The required spare capacity for each backup path is decided by a binary flow allocation variable $x_{r,p}$, where $x^{r,p}=1$, if and only if, path p in $P^r$ is used for backup of traffic flow r. The reserved spare capacity $s_l$ on link 1 is determined from the backup flow allocation $x^{r,p}$ and $m_r$.

As previously mentioned, prior art methods use an Integer Programming ("IP") model to represent the spare capacity allocation problem. The following formulas can be derived from the IP model which represent the spare capacity allocation problem. The objective function of the first equation is the minimization of the total cost of the reserved spare capacity for the network. Equation (1) is as follows:

$$\min \sum_{l \in \mathcal{L}} c_l s_l \qquad (1)$$

Constraints present in the second equation on the other hand, guarantee that one and only one backup path exists for the traffic demand r. Equation (2) is as follows:

$$\sum_{p \in \mathcal{P}^r} x^{r,p} = 1 \quad \forall r \in \mathcal{D} \qquad (2)$$

The constraints present in equation (3) reflect that the total spare capacity reserved on the link $s_l$ is the maximum of the total required spare capacity over all failure scenarios involving link 1. For example if link 1 is used by backup paths of several node pairs, equation (3) gives the total spare capacity that must be found to restore traffic flow for each node pair that uses link 1. Equation (3) is as follows:

$$s_l \geq \sum_{r \in \mathcal{D}_f} \left( m_r \sum_{p \in \mathcal{P}^r} \delta_l^{r,p} x^{r,p} \right), \quad \forall l, f \in \mathcal{L}, l \neq f \qquad (3)$$

This IP model formulation is NP-hard. In other words, it is topology-dependent and does not scale with N, L, and D. Therefore, this IP model is difficult to adapt to larger networks.

In an embodiment of the present invention, s, is removed and a new objective formulation with constraints equivalent to that of equation (2) (i.e., that one and only one backup path per traffic demand r) is determined. The new objective function, written as equation (4), is as follows:

$$\min \sum_{l \in \mathcal{L}} c_l \left[ \max_{f \in \mathcal{L} - \{l\}} \left\{ \sum_{r \in \mathcal{D}_f} \left( m_r \sum_{p \in \mathcal{P}^r} \delta_l^{r,p} x^{r,p} \right) \right\} \right] \qquad (4)$$

The maximum spare capacity value found within the brackets in equation (4) is easily explained using a fault management table ("FMT"). The FMT contains a matrix $M_l$, a vector $V_l$, and spare capacity $s_l$. It should be clear to one skilled in the art that other information may also be stored in the FMT.

The matrix $M_l$, called a failure impact matrix, has (L−1) rows indexed by all the other (L−1) links in the network. The entity $p^r$ denotes the index number of selected backup path for a traffic flow $r \in D$, or equivalently, $p^r = \arg_{q=p^r}(x^{r,q}=1)$. The traffic flows whose backup paths include link 1 are used to index the columns in $M_l$. Such flow set is denoted as $$F_l = \{r : \delta_l^{r,p^r} = 1, r \in \mathcal{D}\}.$$

The element on row f and column r, $M_l^{f,r}$, is equal to one or zero depending on whether the working path of traffic flow $r \in F_l$ includes link f or not, where $f \in L-\{l\}$.

The vector, $V_l$, is a column vector with L−1 elements. The f-th element $v_l^f$ gives the traffic demand to be restored when link f fails. The minimum spare capacity required on link 1 when link f fails can be written as:

$$v_l^f = \sum_{r \in F_l} M_l^{f,r} m_r.$$

Therefore, it is clear that the spare capacity to be reserved on this link, $s_l$, is the maximum of the spare capacity required in all failure scenarios. Thus s, is given determined using the equation:

$$s_l = \max_{f \in \mathcal{L}-\{l\}} v_l^f.$$

Note that the transpose of said column vector $V_l$ is equivalent to the l-th row vector in spare provision matrix C, hence each FMT table stores and calculates one row vector in spare provision matrix C and all the FMT tables of all links stores all row vectors of spare provision matrix C.

Referring again to FIG. 3, the FMT illustrated corresponds to link 1 of the network in FIG. 1. For exemplary purposes, it is assumed that there are four flows (flows No. 3, 4, 6, and 7) in the network, having working paths a-e-d, a-e, b-c-d, and b-e respectively, and backup paths a-b-c-d, a-b-e, b-a-e-d, and b-a-e, respectively. In the current embodiment, it is assumed that all the spare capacity of the backup paths for traffic demand r has been reserved and the related FMT tables are up-to-date. Flows 3, 4, 6, and 7 have their backup paths passing through link 1.

The working path of flow 3 includes link 2 and link 7. The failure of either link 2 or link 7 calls for the spare capacity flow 3 reserved on link 1. Therefore, the entries in the column representing flow 3 and corresponding to links 2 and 7 are assigned the value "1". The links 3–6 in the column representing flow 3 are assigned the value "0". The values for flows 4, 6, and 7 are assigned in the same manner. It should be noted that the values assigned for each flow in set $F_l$ corresponding to each link f creates a matrix Ma.

The failure of link 2 in the current embodiment requires the spare capacity of m3+m4 on link 1, which is the summation of spare bandwidth of all affected flows (here, flows 3 and 4). The spare capacity values required by each link are elements in the vector $V_l$. The final spare capacity reserved on link 1 is $s_l$, which selects the maximum value in $V_l$.

Moreover, given $V_l$ and the working path of a new traffic flow r, the incremental spare capacity on flow link 1 can be calculated. In an embodiment of the present invention, the column for flow r is appended to $M_l$ to create a new failure impact matrix $M_l'$. Likewise, a new $V_l'$ and $s_l'$ are determined. Then incremental spare capacity, $I_l^r$, is determined using the equation $I_l^r = s_l' - s_l$. The value $I_l^r$ represents the potential spare capacity increment if the traffic flow r uses link 1 in its backup path. The value $I_l^r$ is then used in a Successive Survivable Routing scheme ("SSR") to chose a backup path for flow r which further optimizes the spare capacity allocation for the network (i.e., reduces the total spare capacity required by the network). It should be noted that the incremental spare capacity found using the equation $I_l^r = s_l' - s_l$ guarantees that the amount of total spare capacity approximated by SSR will decrease or stay the same. In other words, the total spare capacity result found using SSR will approach the optimal total spare capacity required by the network.

As previously mentioned, SSR approximates the optimal spare capacity allocation ("SCA") required by a network. SSR routes link-disjoint backup paths for individual traffic flows, one at a time. A backup path is determined for each individual traffic flow according to the current network state, as long as the backup path is not carrying any traffic load. As such, SSR reduces the amount of network redundancy needed through the use of iterative computation. SSR achieves increased computational speed, distributive implementation, adaptability to traffic fluctuations, and lower redundancy requirements over the entire network.

In an embodiment of the present invention, a link cost for a backup path corresponding to traffic flow r is calculated from the current network states. The link cost is the incremental spare capacity found using the equation $I_l^r = s_l' - s_l$. A backup path for flow r is then determined using the link cost in conjunction with a shortest backup path routing scheme. The backup path is stored in a manner such that the remainder of the network is notified of the backup path for flow r. For example, SSR updates the FMT tables of all the links within the selected traffic flows backup path. A new total spare capacity allocation can then be calculated. Another traffic flow is then selected and the process repeated. For each traffic flow r, each backup path found using SSR guarantees that the total spare capacity found will be lower than (or at least the same as) the total spare capacity before SSR was implemented. The process is successively repeated until the stable spare capacity allocation required by the network is determined. In one embodiment, SSR is used to approximate the optimal SCA for a network modeled by an integer programming ("IP") model.

Figure 4:
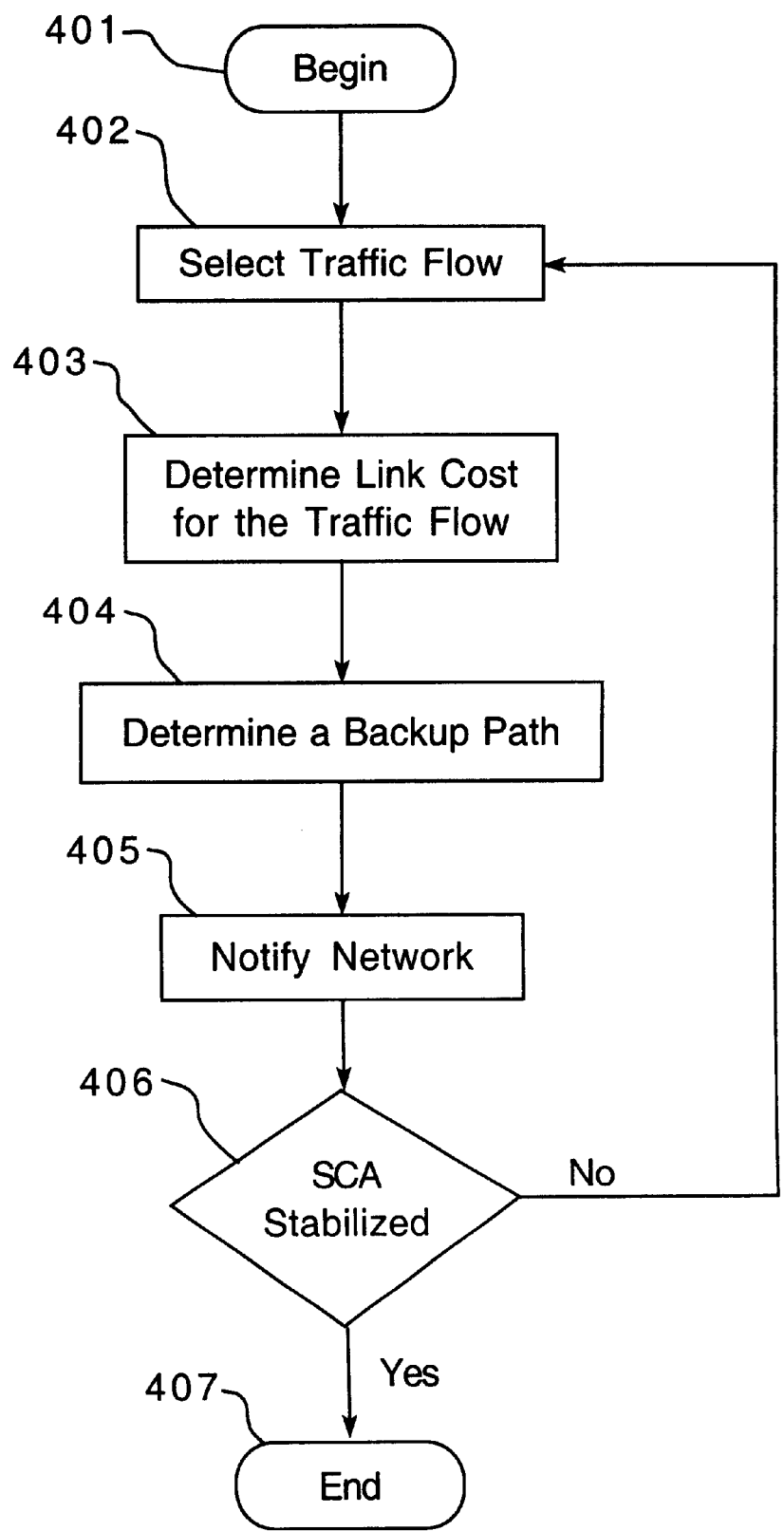
FIG. 4 illustrates an operational process for a Successive Survivable Routing scheme ("SSR") according to an embodiment of the present invention.

FIG. 4 illustrates operational process 400 in which SSR, according to an embodiment of the present invention, is implemented. Operational process 400 uses SSR to approximate the optimal total spare capacity for a network. Operational process 400 calculates a link cost ($c_l$) for a traffic flow r from the network states, uses the link cost to determine a backup path for flow r, and notifies the network of the backup path. Operational process 400 then continues for other traffic flows within the network until the optimal spare capacity allocation for the network is determined.

Operational process 400 is initiated by operation 401. In the current embodiment, operation 401 is programmed to initiate operational process 400 after detecting a change in the network state, such as the occurrence of a network component failure. Alternatively, operation 401 can be programmed to continuously and automatically run within a network by accepting control from operation 405. Likewise, operation 401 can be manually triggered by a user, such as a network designer, administrator, etc. After operational process 400 is initiated, operational control is then surrendered to operation 402.

Operation 402 selects a traffic flow. In the current embodiment, the traffic flow is selected randomly from the set of traffic flows. Alternatively, operation 402 can select the traffic flow using some established criteria (such as selecting a traffic flow that was affected by a change in the network and selecting a traffic flow that was added to the network, among others). Operational control is then surrendered to operation 403.

Operation 403 assumes control after the current backup path is retrieved. Operation 403 determines a link cost for the selected traffic flow. In the current embodiment, operation 403 sets the updated link cost equal to the incremental spare capacity value, $I_l^r = s_l' - s_l$, as discussed above.

Operation 404 assumes control after the link cost is determined for the selected traffic flow. Operation 404 selects a backup path for the selected traffic flow. In the current embodiment, operation 404 uses the link cost with a shortest path algorithm and the current network state to determine the backup path for the selected traffic flow. The link cost allows a shortest path algorithm to find a backup path that tries to share the current available spare capacity on the network. In this manner, the total incremental spare capacity for the backup path of the selected node pair is minimized. Likewise, as the SSR scheme is repeated for all traffic flows in the network, the optimal total spare capacity allocation is approximated. It should be clear to one skilled in the art that any shortest path algorithm may be used to determine the backup path based on this link cost for the selected traffic flow while remaining within the scope of the present invention.

The backup path will have a total link cost that is less than or equal to the total link cost of the current backup path. In the current embodiment, operation 404 minimizes the incremental spare capacity for each backup path. Minimization of the incremental spare capacity is a necessary condition for a optimal multi-commodity-flow ("MCF") solution, because changing any single backup path from the optimal spare capacity allocation solution would only increase the total spare capacity, or equivalently its incremental spare capacity. From this perspective, the incremental spare capacity is used as the link cost of the backup path for each traffic flow. In so doing, distributive backup path routing participates actively in SCA in approximating the optimum. It should be clear to one skilled in the art, however, that other methods may be used to minimize the total link cost of the selected backup path while remaining within the scope of the present invention.

Operation 405 then assumes control from operation 404. Operation 405 notifies the network that a backup path has been determined for the selected traffic flow. In the current embodiment, operation 405 notifies the network by updating the FMT stored in each node that the backup path uses. It should be clear to one skilled in the art, however, that other notification methods can be employed.

Determination operation 406 assumes control after the network has been notified by operation 405. Determination operation 406 ascertains whether the spare capacity allocation has stabilized. If the spare capacity allocation has stabilized, operational control branches YES and operation 407 terminates operational process 400. If the spare capacity allocation has not stabilized, operational control branches NO and operation 402 assumes operational control and selects another traffic flow. In one embodiment, operation 406 compares the total spare capacity allocation calculated from the last iteration of operational process 400 to a spare capacity allocation calculated prior to the last iteration. The difference between these two values are compared the a threshold value set by the network designer. If the last iteration does not improve the networks total spare capacity requirement, operational control branches YES, whereas if an improvement occurs, operational control branches NO.

Alternatively, determination operation 406 can determine whether the last given number of iterations have improved the total spare capacity allocation. Thus, if the iterations have improved the network's spare capacity allocation, then operational control branches YES, else operational control branches NO. It should be appreciated by one skilled in the art that many other methods for determining whether a stable spare capacity approximation has been reached can be used while remaining within the scope of the present invention.

It should be noted that SSR can be implemented in an link state routing protocol (such as Open Shortest Path First protocol). Each directed link maintains per-flow information in FMT. The aggregated information in vector VI is advertised periodically. Each node collects all $V_l$ information, forms a spare provision matrix C, and routes backup paths for all the traffic flows originating from it. SSR broadcasts state information at a complexity of $O(L^2)$. Hence, it is scalable with the increasing flow numbers in a network.

The Successive Survivability Routing scheme can be implemented within each node in a distributed manner, within a single processor in a centralized manner, or with a combination of the each node and a single processor. In one embodiment, the Successive Survivability Routing scheme (including updating the fault management table) is implemented within each node in a distributed manner. A node is a computer, mainframe, terminal, switch, router, and relay among others. In the current embodiment, each node possesses a processor, a memory, and an input/output device, among others.

Figure 5:
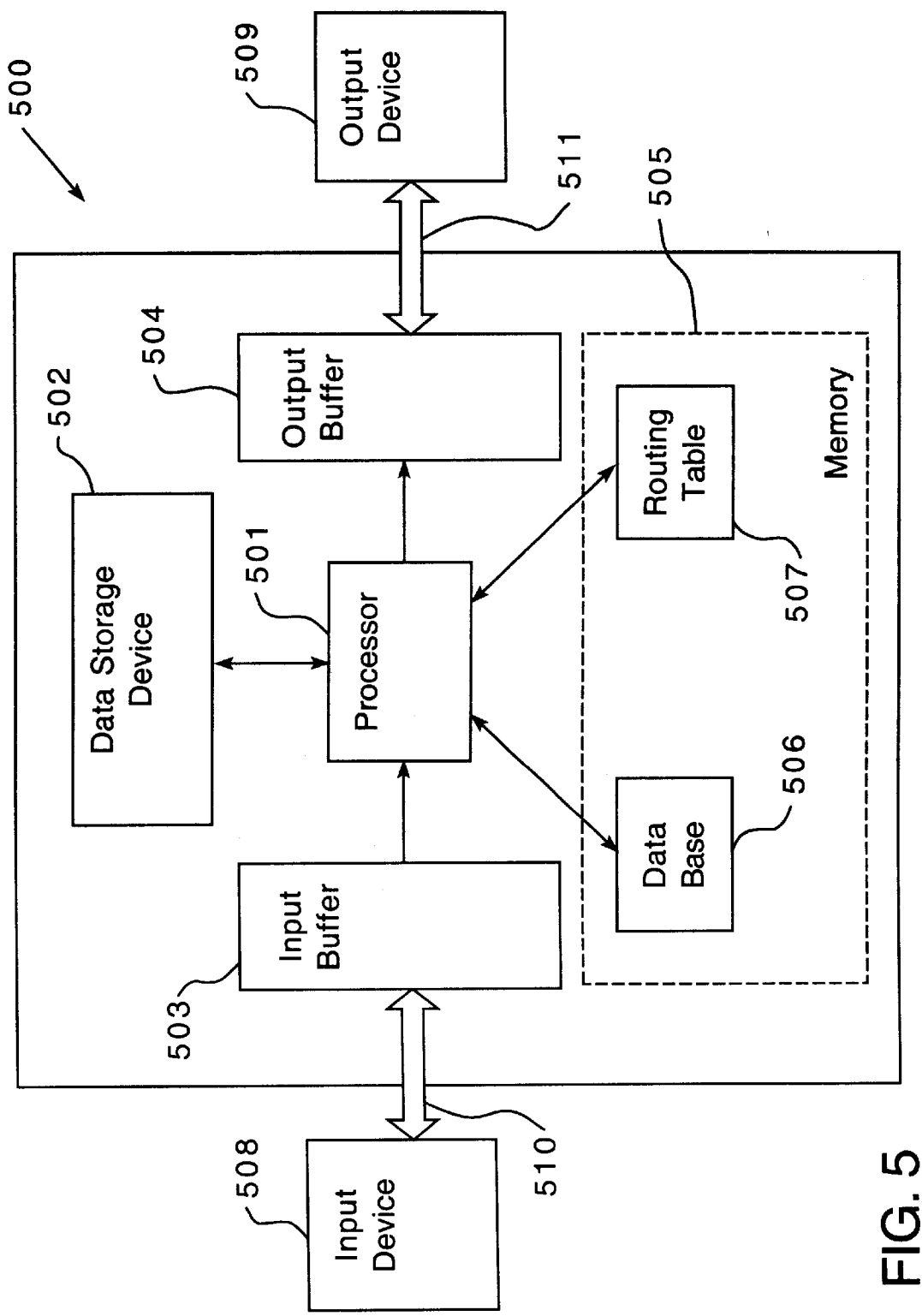
FIG. 5 illustrates a system 500 used in operation with a network to create a spare provision matrix and implement the Successive Survivable Routing scheme in accordance with an embodiment of the present invention.

FIG. 5 illustrates a system 500 used in operation with a network to create a spare provision matrix and implement the Successive Survivable Routing scheme in accordance with an embodiment of the present invention. System 500 is comprised of a processor 501, a data storage device 502, an input buffer 503, an output buffer 504, a memory 505 having a database 506 and routing table 507 therein, an input device 508, an output device 509, and input port 510 and an output port 511.

The system 500 can be implemented in any personal computer, mainframe, calculator, switch, router, and relay among others. The processor 501 is any device capable of accepting input information, executing an instruction or series of instructions (for example instructions encoded into a computer program, etc.), and providing output information, among others. The data storage device 502 is any optical disc drive, magnetic disc drive and magnetic tape drive among others. The input buffer 503, output buffer 504, and memory 505 is any device capable of storing information such as random-access-memory (RAM), read-only-memory (ROM), dynamic-random-access-memory (DRAM), and flash memory among others. The database 506 contains information relating to the nodes, link, traffic flows, and network state, among others. The routing table 507 contains information relating to the paths used by traffic flows, the network state, and the network topology, among others. The input device 508 and output device 509 is any keyboard, sensor, scanner, touch pad, printer, display, terminal, modem, and wire carrier, among others. The input port 510 and the output port 511 can be any type of connection capable of receiving or outputting information as is known in the art. Although one embodiment of the system is shown, it should be clear to one skilled in the art that other embodiments are possible. For example, the input device and output device can be combined into one device, the database and routing table can be combined into one data structure, and the input and output buffers can by combined into one buffer, among others.

The above-described embodiments of the invention are intended to be illustrative only. Numerous alternative embodiments may be devised by those skilled in the art without departing from the scope of the following claims.

What is claimed is:

1. A method for defining network parameters during network design, comprising:
   determining a working path for each of a plurality of traffic flows in a network, said working path originating at a source node and terminating at a destination node;
   aggregating said working paths into a first matrix;
   determining a backup path for each of said plurality of traffic flows, said backup path originating at said source node and terminating at said destination node;
   aggregating said backup paths into a second matrix;
   deriving a resource provisioning template for said network based on said first and said second matrices, said resource provisioning template having a first set of information defining a network parameter for said source node and a second set of information defining said network parameter for said destination node; and
   storing said first set of information and said second set of information within said source node.

2. The method of claim 1 wherein said step of deriving includes the step of calculating the product $C=B^T \cdot \text{Diag}(m) \cdot A$, where C represents said resource provisioning template, $B^T$ represents the transverse of said second matrix, m is a vector representing a capacity requirements for all traffic flows, and A represents said first matrix.

3. The method of claim 1 wherein said step of aggregating said working paths into said first matrix includes aggregating such that said first matrix has a node-pair-traffic-flow and a link number as indices, and for an element within said first matrix, further includes assigning a value of 1 to said element if said element has a node-pair-traffic-flow traversing a corresponding link and assigning a value of 0 to said element if said element does not have a node-pair-traffic-flow traversing a corresponding link.

4. The method of claim 1 wherein said step of aggregating said backup paths into said second matrix includes aggregating such that said second matrix has a node-pair-traffic-flow and a link number as indices, and for an element within said second matrix, further includes assigning a value of 1 to said element if said element has a node-pair-traffic-flow traversing a corresponding link and assigning a value of 0 to said element if said element does not have a node-pair-traffic-flow traversing a corresponding link.

5. A method for determining a minimum spare capacity required for one of a plurality of links in a network, said network having a plurality of nodes interconnected by said plurality of links, said network operable to pass a plurality of traffic flows over a plurality of paths, each of said paths having at least one of a source node, a link, and a destination node, the method comprising:
   creating a spare provision matrix; and
   determining said minimum spare capacity required for one of said plurality of links for restoring one or more paths in said network from said spare provision matrix.

6. The method of claim 5 wherein said step of creating a spare provision matrix further comprises calculating the product $C=B^T \cdot \text{Diag}(m) \cdot A$, where C represents the spare provision matrix, $B^T$ represents the transverse of a backup-path-link-incidence matrix, m is a vector representing the capacity requirements for all traffic flows, and A represents a working-path-link-incidence matrix.

7. The method of claim 6 wherein said step of creating a spare provision matrix further comprises:
   determining a working path for a first traffic flow, said working path for said first traffic flow originating at a first source node, traversing at least one of a working path link, and terminating at a first destination node;
   aggregating said working path for said first traffic flow into said working-path-link-incidence matrix;
   determining a backup path for said first traffic flow, said backup path for said first traffic flow originating at said first source node, traversing at least one of a backup path link, and terminating at said first destination node, said backup path link being link-disjoint from said working path link;
   aggregating said backup path for said first traffic flow into said backup-path-link-incidence matrix; and
   repeating the previous steps for a desired number of traffic flows.

8. The method of claim 5 wherein determining said minimum spare capacity required for one of said plurality of links in said network from said spare provision matrix further comprises:
   selecting a link i whose minimum spare capacity requirement is to be determined;
   retrieving a spare provision matrix element $C_{ij}$ from said spare provision matrix for each $j=\{1 \ldots L\}$, where said element $C_{ij}$ represents a minimum spare capacity required on link i when link j fails and L is the total number of links on said network; and
   determining $s_i$, where $s_i = \max C_{ij}$.

9. The method of claim 8 further comprising calculating the total spare capacity allocation for a network, said total spare capacity being equal to the sum of said minimum spare capacities required for each link for links 1 through L.

10. A method for determining a total spare capacity allocation for a network, comprising:
    creating a spare provision matrix; and
    deriving the total spare capacity allocation for said network from said spare provision matrix, wherein said deriving includes calculating a vector $s=[s_1, s_2, \ldots, s_L]$, where $s_i = \max C_{ij}$ and $C_{ij}$ represents an element in row i, column j of said spare provision matrix C, and wherein said spare capacity allocation relates to path restoration of said network.

11. The method of claim 10 wherein said step of creating the spare provision matrix further comprises calculating the product $C=B^T \cdot \text{Diag}(m) \cdot A$, where C represents the spare provision matrix, $B^T$ represents the transverse of a backup-path-link-incidence matrix, m is a vector representing the capacity requirements for all traffic flows, and A represents a working-path-link-incidence matrix.

12. The method of claim 11 wherein said step of creating a spare provision matrix further comprises:
    determining a working path for a first traffic flow from a source node to a destination node;
    aggregating said working path for said first traffic flow into said working-path-link incidence matrix;
    determining a backup path for said first traffic flow;
    aggregating said backup path for said first traffic flow into said backup-path-link-incidence matrix; and repeating the previous steps for a desired number of traffic flows.

13. A method for successively approximating an optimal spare capacity allocation for a network, said network having a plurality of traffic flows, each of said traffic flows having a working path and a backup path, the method comprising:
   selecting a traffic flow;
   determining an incremental spare capacity link cost associated with said traffic flow;
   determining a backup path using said link cost;
   notifying said network of said backup path for said traffic flow; and
   repeating the previous steps for a next traffic flow.

14. The method of claim 13 wherein determining a link cost associated with said backup path of said traffic flow further comprises gathering information from at least one of a plurality of fault management tables having information related to said current network state, at least one of said fault management tables being stored within a network node.

15. The method of claim 13 wherein determining a backup path for said traffic flow further comprises using a shortest path algorithm, said shortest path algorithm utilizing said link cost.

16. The method of claim 13 wherein notifying said network of said backup path for said traffic flow further comprises updating at least one of a plurality of fault management tables within said network.

17. The method of claim 16 further comprising storing information for a link 1 related to said traffic flow, said working path, said backup path, said link cost and a spare capacity reservation in a fault management table.

18. The method of claim 17 wherein said step of storing information further comprises composing a matrix $M_l$, a vector $V_l$, and a spare capacity reservation $s_l$ within the fault management table, where $M_l$ is a failure impact matrix having L−1 rows indexed by all the other L−1 links in the network, $V_l$ is a column vector with L−1 elements, L is the total number of links on the network, and l is a link index.

19. The method of claim 13 wherein notifying said network of said backup path for said traffic flow further comprises updating said current network state.

20. The method of claim 13 further comprising terminating said repeating step after said spare capacity allocation has been stabilized.

21. A method for dynamically creating a fault management table, said fault management table being used by a network having a total number of links equal to L, the method comprising:
   storing a matrix $M_l$ within the fault management table, where $M_l$ is a failure impact matrix having L−1 rows indexed by all the other L−1 links in the network, said L−1 rows representing a link f each column of $M_l$ representing a traffic flow r having a backup path using said link 1;
   storing a vector $V_l$ within the fault management table, where $V_l$ is a column vector with L−1 elements, said elements being denoted as $v_l^f$ and being representative of the minimum spare capacity required by a link 1 when said link f fails; and
   storing a spare capacity $s_l$ within the fault management table, where $s_l$ represents a maximum spare capacity required for said link 1 for all failure scenarios of said link f.

22. The method of claim 21 wherein storing said matrix $M_l$ further comprises, for an element $M_l^{f,r}$ in said matrix $M_l$:
   assigning a value of 1 to said element $M_l^{f,r}$ if the working path of said traffic flow r is using said link f; and
   assigning a value of 0 to said element $M_l^{f,r}$ if the working path of said traffic flow r is not using said link f.

23. The method of claim 21, additionally comprising: evaluating the value $$\sum_r (m_r M_l^{f,r})$$

to dynamically update an element $v_l^f$, where $v_l^f$ is an element in $V_l$, and where $m_r$ is a traffic demand of flow r.

24. The method of claim 23 wherein said evaluating step further comprises employing a search-based heuristic technique.

25. The method of claim 21 further comprising calculating said spare capacity $s_l$ as, $$s_l = \max_{f \in \mathcal{L}-\{l\}} v_l^f,$$

where a value $v_f$ is the f-th element of vector $V_l$, $v_l^f$ representing a traffic demand to be restored when a link f fails.

26. The method of claim 21 further comprising determining an incremental spare capacity for a link 1 using said vector $V_l$ and a working path of a new traffic flow r, said method comprising:
   determining a matrix $M_l'$, where $M_l'$ is said matrix $M_l$ with flow information related to said new traffic flow r appended as a new column thereon;
   determining a vector $V_l'$, where $V_l'$ is an updated column vector $V_l$, and said $V_l'$ is dependent on $M_l'$;
   determining a $s_l'$, where $S_l'$ is an updated spare capacity $s_l$; and
   determining said incremental spare capacity $I_l^r$, where $I_l^r = S_l' - S_l$ and $I_l^r$ represents a potential spare capacity increment if the backup path of said new traffic flow r uses said link 1.

27. An apparatus for operation within a network having a plurality of nodes, a plurality of links, and a plurality of traffic flows, said links interconnecting said nodes to enable said traffic flows, the apparatus comprising:
   an input port for receiving information related to said nodes, links, and traffic flows;
   a processor operable to receive said information from said input port, said processor operable to derive a spare provision matrix from said information; and
   an output port operable to receive information from said processor, said output port for outputting information related to said spare provision matrix.

28. The apparatus of claim 27 wherein said processor is operable to update said spare provision matrix in response to a change in network status.

29. The apparatus of claim 27 wherein said processor is operable to update said spare provision matrix to approximate an optimal spare capacity allocation.

30. An apparatus for operation within a network having a plurality of nodes, a plurality of links, and a plurality of traffic flows, said nodes interconnected by said links to enable said traffic flows, the apparatus comprising:
   an input port for receiving information related to said nodes, links, and traffic flows;
   a processor operable to receive said information from said input port, said processor operable to derive a fault management table from said information and dynamically implement a successive survivability restoration scheme; and an output port operable to receive information from said processor, said output port for outputting information related to said fault management table and said successive survivability scheme.

31. The apparatus of claim 30 wherein said apparatus further comprises a database having an original fault management table and an updated fault management table, said original fault management table containing a matrix $M_l$, a vector $V_l$, and a spare capacity allocation $s_l$, said updated fault management table containing a matrix $M_l'$, a vector $V_l'$, and a spare capacity allocation $s_l'$.

32. The apparatus of claim 31 wherein said processor is operable to update said updated fault management table to approximate an optimal spare capacity allocation.

33. The apparatus of claim 30 wherein said successive survivability scheme further comprises:

a working path for a traffic flow, said working path having a source node, a working path link, and a destination node;

a backup path for said traffic flow, said backup path having said source node, a backup path link, and said destination node; and a link cost, said link cost being associated with said backup path.

* * * * *